Aug. 21, 1962 W. MÄHLER 3,050,017
METHOD OF PRODUCING BISCUITS OR LIKE BAKED PRODUCTS AND
APPARATUS FOR PERFORMING THE SAME
Filed May 22, 1961

Inventor:
Willi Mähler
By Cushman, Darby & Cushman
Attorneys

United States Patent Office 3,050,017
Patented Aug. 21, 1962

3,050,017
METHOD OF PRODUCING BISCUITS OR LIKE BAKED PRODUCTS AND APPARATUS FOR PERFORMING THE SAME
Willi Mähler, Seulberger Weg, Friedrichsdorf (Taunus), Germany
Filed May 22, 1961, Ser. No. 111,705
Claims priority, application Germany May 25, 1960
11 Claims. (Cl. 107—1)

The present invention relates to a method of producing moulded biscuits or like baked products and apparatus for performing the same. Said moulded biscuits hereinafter referred to as biscuits.

In the production of biscuits or like baked products it is the practice to use engraved forming cylinders, the dough being squeezed into cavities cut into the cylinders and the shaped pieces of dough being extracted therefrom by an endless suction belt. The belt conveys the formed shapes either to the oven or to places where the shapes are submitted to further processing.

The production of biscuits or the like which consist of two or more different kinds of dough or mixtures involves manual work. The shapes of dough produced on the moulding cylinder are coated by hand, for instance with sponge mixtures, short mixtures, or other materials, and then conveyed to the oven. For producing filled or sandwich biscuits the shapes must be provided, by hand, with the coating or filling mixture and the whole must then be provided with a top layer of dough, likewise by hand.

It is the object of the present invention to eliminate the tedious and time-consuming manual work and fully automatically to perform the entire process of making biscuits which consist of two or more different doughs or mixtures and to get them ready for the oven.

This object is achieved by applying with the aid of perforated moulding means a second layer of dough to the dough shapes extracted by an endless travelling belt from a forming cylinder. Instead of a second kind of dough, some other mixture or filling can thus be applied to the shapes.

If the product is to be a sandwich-type biscuit the filling which is applied to the shapes must further be covered or enclosed by a further layer of dough. This is performed by the application of tops, that is to say of dough shapes of similar outline to that of the primary shape. The shaped tops are produced in similar manner to the original shapes by a forming cylinder co-operating with a travelling belt.

For performing this method the invention proposes to associate with a forming cylinder of known kind a framelike moulding means in the form of a perforated belt. This belt, which is conducted over two rollers, is provided with windows which in outline and size correspond with the cavities recessed into the circumference of the forming cylinder. The perforated belt travels in synchronism with the peripheral speed of the cylinder in such manner that the shapes which have been extracted from the forming cylinder by the suction belt move into register with the windows in the perforated belt. Dough, a filling or a mixture is introduced into the space between the two rollers and the upper and lower strands of the perforated belt. A strickle is used to press the additional layer of dough or other material, through the windows on to the shapes of dough framed by the windows.

With advantage the perforated belt can be replaced by a perforated cylinder (as in the hereinafter described embodiment) as this will permit the length of the machine to be reduced and the feeding of the additional dough, mixture, or the like, to be simplified.

The method as well as apparatus for performing the same will be hereinafter described by reference to the accompanying schematic drawing which represents a preferred embodiment of apparatus equipped with the proposed perforated cylinder and an additional forming cylinder. Further features of the invention will emerge as the description proceeds.

A forming cylinder of conventional kind with cavities 2 recessed into its peripheral surface is shown at 1. As is likewise already known, these cavities are filled with dough 4 from a hopper 3 by means of a fluted roller 5. The shapes of dough 7 which are smoothed down in the cavities by a scraper blade 6 are extracted from these cavities by an endless suction belt 8. To this end the belt 8 runs over rollers 9 and 10. Operationally following this device is a perforated cylinder 11. This cylinder has a hollow interior and is provided with perforations which in outline and size correspond with the cavities 2 in the forming cylinder 1, and which therefore conform with the dough shapes 7. The thickness of the shell of cylinder 11 is suitably chosen to exceed the thickness of the shapes 7 by the thickness of the additional layer which it is intended to apply to the shapes. This can be clearly seen in the drawing at 13. It is also advisable to form a step in each perforation marking the thickness of the layer that is to be applied to the shapes, as indicated at 14, in such manner that the dimensions of the additional layer will be slightly less than the dimensions of the shapes 7 to which this layer is applied.

The dough, mixture, or the like, is introduced into the hollow interior of cylinder 11 in the axial direction. A guide roller 10 between the forming cylinder 1 and the perforated cylinder 11 ensures that the envelopment angle of the suction belt 8 around cylinder 11 is fairly large, so that the mixture 16 which is retained by and builds up behind the strickle 15 cannot escape, even if it is of a mobile character and could otherwise flow. It is thus forced exclusively on to the surfaces of the shapes 7 which are framed by the perforations 12. After having been smoothed down by the strickle 15, which may be elevationally adjustable, the layers shown at 17 will appear superimposed on the shapes 7.

If the applied layer is a filling material which is to be sandwiched between two layers of dough, a top layer of dough must still be deposited on the filling.

This is accomplished by the provision of a further forming device which is indentical with that hereinabove already described. This device comprises a feeder hopper 18, a forming cylinder 19, a fluted roller 20 and a suction belt 21 which runs over a roller 22. The top layers 23 are deposited on the coated shapes 7, 17 which are conveyed by suction belt 8 to the collating point 24.

The cylinders 1, 11 and 19 must revolve in synchronism and means must be provided to ensure that the belts 8 and 23 travel at a constant conformable speed. This can be achieved by transmission means in a manner that is well understood.

The preformed and filled and possibly covered dough shapes leave the machine ready for baking. They may be glazed or dusted with known coating and dusting devices, if this is desired. The product which is ready for baking may be deposited on tins or directly run on to the conveyor of a continuous oven.

Since rice paper is available in the form of endless rolled bands, such a band may be run through the machine on belt 8. The shapes are then formed on the rice paper and, in such a case, cylinder 11 may normally be the only one used, after the cylinder 1.

What I claim is:
1. A continuous method producing biscuits and other dough shapes with an applied layer of additional material which comprises progressively moulding the dough shapes in an endless travelling series of cavities in the surface of a cylinder, transferring the moulded shapes to a further endless travelling series of moulding cavities and producing the layers of additional material on the said moulded shapes in the said further cavities.

2. A continuous method according to claim 1 which further comprises moulding further dough shapes at another region and applying said further dough shapes to the said layered shapes to form sandwich products.

3. A continuous method according to claim 1 in which said cylinder cavities are recesses and said cavities of the said endless travelling series are apertures, said moulded shapes being entered from one end of said apertures and the layering material being entered from the other end and comprising the step of spreading said material to smooth the layers retained in said apertures.

4. Apparatus for continuously producing biscuit or other dough shapes with an applied layer of additional material which comprises a forming cylinder provided with an endless series of peripheral moulding cavities, means providing a further endless series of moulding cavities which are of shape and size to accommodate the shapes moulded in the said cylinder, continuously operable means for transferring the moulded shapes from the cylinder to the said further endless series of moulding cavities and means for producing layers of additional material on the shapes in the cavities of said further endless series of cavities.

5. Apparatus according to claim 4 in which the said further series of molding cavities are formed by apertures in the peripheral wall of a hollow cylinder.

6. Apparatus according to claim 4 in which the said further series of moulding cavities are formed by apertures in an endless belt.

7. Apparatus according to claim 4, comprising means to displace said cavities in the cylinder and said further endless series of cavities in synchronism.

8. Apparatus according to claim 4 comprising an endless conveyor belt which by suction detaches the dough shapes from the said cylinder, said further endless series of cavities being formed by perforations in a cylinder, said belt partly enveloping the said perforated cylinder and serving to convey the said shapes to the perforations from the forming cylinders, and an axially extending strickle inside the said perforated cylinder within the envelopment region co-operating with the said perforations for layering said additional material therein.

9. Apparatus according to claim 8 comprising a guide roller for the suction belt between the forming and perforated cylinders.

10. Apparatus according to claim 4 comprising a second forming cylinder which operationally follows the means providing the further endless series of cavities, said second forming cylinder co-operating with a suction belt which delivers tops shaped by said second forming cylinder to the layers on the shapes conveyed on the first said suction belt.

11. Apparatus according to claim 8 in which the said strickle is adjustable elevationally.

References Cited in the file of this patent
UNITED STATES PATENTS

| | | |
|---|---|---|
| 1,858,175 | Tunstall | May 10, 1932 |
| 2,146,786 | Baker | Feb. 14, 1939 |
| 2,189,214 | MacFarlane et al. | Feb. 6, 1940 |
| 2,201,402 | Knaust | May 21, 1940 |
| 2,846,960 | Govatsos | Aug. 12, 1958 |